US007836394B2

(12) United States Patent
Linder

(10) Patent No.: US 7,836,394 B2
(45) Date of Patent: Nov. 16, 2010

(54) INTERACTIVE, CUSTOMIZABLE DISPLAY AND ANALYSIS OF ELECTRONICALLY TAGGED FINANCIAL INFORMATION

(75) Inventor: Eric Paul Linder, New York, NY (US)

(73) Assignee: SavaNet LLC, New York, NY (US)

( * ) Notice: Subject to any disclaimer, the term of this patent is extended or adjusted under 35 U.S.C. 154(b) by 1001 days.

(21) Appl. No.: 11/405,501

(22) Filed: Apr. 18, 2006

(65) Prior Publication Data

US 2007/0244775 A1    Oct. 18, 2007

(51) Int. Cl.
G06F 17/00 (2006.01)
(52) U.S. Cl. .................................................... 715/234
(58) Field of Classification Search ......... 715/235–236, 715/234
See application file for complete search history.

(56) References Cited

U.S. PATENT DOCUMENTS

| | | | |
|---|---|---|---|
| 6,292,811 B1* | 9/2001 | Clancey et al. ............... 715/210 |
| 6,959,384 B1* | 10/2005 | Serret-Avila ................. 713/176 |
| 7,293,031 B1* | 11/2007 | Dusker et al. ....................... 1/1 |
| 2003/0037038 A1* | 2/2003 | Block et al. ..................... 707/1 |
| 2003/0135516 A1* | 7/2003 | Goodwin et al. ......... 707/103 R |
| 2003/0172013 A1* | 9/2003 | Block et al. ..................... 705/33 |
| 2004/0177062 A1* | 9/2004 | Urquhart et al. ............... 707/3 |
| 2004/0236858 A1 | 11/2004 | Schwartz |
| 2005/0102212 A1 | 5/2005 | Roy |
| 2005/0144096 A1* | 6/2005 | Caramanna et al. ........... 705/30 |
| 2005/0154628 A1 | 7/2005 | Eckart et al. |
| 2005/0183002 A1* | 8/2005 | Chapus ........................ 715/505 |
| 2005/0197931 A1* | 9/2005 | Gupta ........................... 705/30 |
| 2005/0216861 A1* | 9/2005 | Hurewitz et al. ............. 715/822 |
| 2006/0036527 A1 | 2/2006 | Tinnirello et al. |
| 2006/0041492 A1* | 2/2006 | Takahashi et al. ............. 705/35 |
| 2006/0041494 A1 | 2/2006 | Tinnirello et al. |
| 2006/0167704 A1* | 7/2006 | Nicholls et al. ................ 705/1 |
| 2006/0184539 A1* | 8/2006 | Blake et al. ................... 707/10 |
| 2006/0230025 A1* | 10/2006 | Baelen .......................... 707/3 |
| 2007/0022093 A1* | 1/2007 | Wyatt et al. .................... 707/2 |

(Continued)

FOREIGN PATENT DOCUMENTS

JP    2005043932 A  *  2/2005

OTHER PUBLICATIONS

Richard et al., Development of a Prototype Public File Repository for XBRL Documents: Chalenges and Opportunities, 2004, The International Journal of Digital Accounting Research, vol. 4, N. 7, pp. 57-59.*

(Continued)

Primary Examiner—Doug Hutton
Assistant Examiner—Frank D Mills
(74) Attorney, Agent, or Firm—Pillsbury Winthrop Shaw Pittman LLP

(57) ABSTRACT

A software application which allows for the structured access, customizable display and analysis of financial data in XML or other formats retrieved from either local files or internet databases or internet file directories. The application displays text-based electronically-tagged financial data as interactive documents using a multiple document interface and interactive display settings. The application retrieves information specific to the file, its financial content, and publisher to both create a customized presentation and perform both content-specific and comparative financial analysis of data from a variety of sources.

80 Claims, 8 Drawing Sheets

U.S. PATENT DOCUMENTS

2007/0050698 A1* 3/2007 Chopin et al. .............. 715/503
2007/0050702 A1* 3/2007 Chopin et al. .............. 715/507
2007/0078877 A1* 4/2007 Ungar et al. ............... 707/101

OTHER PUBLICATIONS

Fujitsu Software Corporation Press Release, Fujitsu Announces the World's Most Advanced XBRL Software Toolkit With the Availability of Interstage Xwand Version 7, Mar. 1, 2005, Fujitsu Software Corporation, pp. 1-3, Retrieved from http:/www.fsw.fujitsu.com/news/year2005/press03-01-2005.html.*

Naumann, Tap Into XBRL's Power the Easy Way, May 2004, Journal of Accountancy, May 2004 Issue, pp. 1-12, retrieved from http://www.journalofaccountancy.com/Issues/2004/May/TapIntoXbrlSPowerTheEasyWay.htm.*

Deshmukh, XBRL, 2004, Communications of the Association for Information Systems, vol. 13, Article 16, pp. 196-219.*

Suzuki, XBRL Processor "Interstage Xwand" and Its Application Programs, Jun. 2004, Fujitsu Science Technology Journal, vol. 40, Ed. 1, pp. 74-79.*

"SEC's Chief Information Officer Addresses Challenges of XBRL Technology", SEC Today, vol. 2006-16 (Jan. 25, 2006).

* cited by examiner

Nextel Communications Inc
Valuation Analysis

All numbers in millions

| Market Values | | FY End - Dec | 2004A | 2003A | 2002A |
|---|---|---|---|---|---|
| | | Revenue | 13,368 | 10,820 | 8,721 |
| Currency: | US Dollar | EBITDAP | 5,148 | 4,244 | 3,463 |
| Scale: | Millions | EBITDA | 5,148 | 4,244 | 3,463 |
| | | Cash Earnings | 4,940 | 3,368 | 1,735 |
| | | Recurring Income | 3,094 | 1,466 | 413 |
| Last Price (as of 3/15/05): | 28.61 | Net Income | 2,991 | 1,446 | 1,634 |
| * Avg. Shares Outstanding, Diluted: | 1,152 | Free Cash Flow to Equity | 2,164 | 1,488 | (423) |
| = Market Capitalization (MC): | 32,959 | R.E.P.S. | 2.69 | 1.35 | 0.43 |
| | | E.P.S. | 2.60 | 1.33 | 1.69 |
| + Minority Interest Book Value: | – | Dividend | 0.00 | 0.00 | 0.00 |
| * Price / Book Ratio: | 3.5 | | | | |
| = Minority Interest Market Value: | – | Valuation Multiples | | | |
| | | FV/Revenue | 3.0 | 3.6 | 4.4 |
| - Unconsolidated Asset Value: | – | SV/EBITDAP | 7.7 | 9.2 | 11.1 |
| + Preferred Equity: | 108 | EV/EBITDA | 7.7 | 9.2 | 11.1 |
| = Consolidated Equity (CE): | 33,067 | CE/Cash Earnings | 6.7 | 9.3 | 16.6 |
| | | Consolidated Equity/FCFE | 15.3 | 21.0 | (68.1) |
| | | Price/R.E.P.S. | 10.6 | 20.3 | 198.8 |
| + Debt, Non-Financial Services: | 8,549 | Price/E.P.S. | 11.0 | 21.5 | 16.9 |
| - Cash and Investments: | (2,107) | Dividend Yield | 0.0% | 0.0% | 0.0% |
| = Enterprise Value (EV): | 39,509 | | | | |
| + Environmental and Legal Liabilities: | 0 | | | | |
| + Pension/Benefits Under(Over)funding: | – | | | | |
| = Stakeholder Value (SV): | 39,509 | | | | |
| + Off-Balance Sheet Financing: | | | | | |
| + Financial Services Obligations: | 0 | | | | |
| = Firm Value (FV): | 39,509 | | | | |

FIG. 6

INTERACTIVE, CUSTOMIZABLE DISPLAY AND ANALYSIS OF ELECTRONICALLY TAGGED FINANCIAL INFORMATION

FIELD OF THE INVENTION

The invention relates to a computer software-based desktop application for interactive, customizable display and analysis of electronically tagged financial information in XBRL or other formats.

BACKGROUND OF THE INVENTION

The Securities & Exchange Commissions (SEC) requires companies to file various types of financial reports and financial reports are also widely published by other organizations for various non-regulatory commercial purposes. Reporting obligations to the SEC are usually satisfied by companies filing with the SEC various types of reports. Other types of reports containing financial information, such as financial research reports, are also known. These and other financial reports may be published in PDF, Microsoft Excel® spreadsheet format, Microsoft Word® word processor format, Extensible Markup Language (XML), HyperText Markup Language (HTML) or other types of document formats. Each of these formats has certain disadvantages. For example, a PDF document is relatively static, not easily customizable, and does not have analysis capability, among other things. Information in spreadsheets (e.g., Excel®) and text documents (e.g., Word®) often require extensive importing and exporting to or from multiple files and additional work in order to create comparison views. It is also very difficult to search for specific content within these other document formats. XML data generally requires the use of a browser-based application (with or without the use of stylesheets) or importation into another application format, such as spreadsheet or other document format, to view the information. These browsers and other applications either have very limited capabilities with respect to customizing the display of and analyzing such data or require that extensive additional work be performed in order to do so. Other drawbacks exist with these and other known document formats and applications.

Another set of problems relates to the fact that different companies may use different taxonomies, or data schemas, to express the terms used in various financial reports. This can make it very difficult to automatically analyze and directly compare multiple companies' financial data with each other without having to do substantial manual data manipulation, which is time consuming and generally inefficient and error prone.

Recently, eXtensible Business Reporting Language (XBRL) has emerged as a standard for creating financial and other business reports. XBRL is an XML-based markup language created specifically for financial and other business reporting. It allows individual items of financial data to be identified using computer readable tags and associated metadata. The specification for creating XBRL documents is known in the art of financial reporting and can be found at http://www.xbrl.org. The current specification (version 2.1) is hereby incorporated it its entirety herein. However, the invention is not so limited. Past and subsequent versions of XBRL (and other formats) can be used with the invention. The current XBRL specification relates primarily to how the XBRL data is tagged, structured and associated with metadata. It is less concerned with how the data is presented to the user or analyzed. Nor does it relate to client side processing of data contained in published reports.

XBRL enables unique identifying tags (labels) to be applied to items of financial data (e.g., 'net profit') and provides links to a range of other information about the item, such as a definition, value type, alternative labels etc, collectively referred to as metadata. XBRL also allows labels in any language to be applied to items, as well as accounting references or other definitional information. The XBRL specification contains a design structure for how items within a report are related to one another through referenced calculation links. It allows for groupings of items for organizational or presentational purposes, but this capability is limited and the current specification's presentation capabilities are insufficient to capture formatting common to financial statements. XBRL is extensible, so companies and other organizations can adapt it to meet a variety of special requirements.

Information can be converted into XBRL format by suitable mapping processes or generated in XBRL by software in a known manner. There are many known tools used for creation of XBRL documents. Various taxonomies exist for use in business and financial reports for use in different industries and accounting regimes which can then also be extended through incorporation of additional taxonomies for publisher-specific use. The XBRL formatted data can be exchanged between entities via the internet for regulatory reporting and other purposes However, current implementations of XBRL are not without limitation. XBRL documents may adhere to different taxonomies or schemas which are not directly comparable. There are also a limited number of methods to view the content of XBRL documents which is either performed using complex taxonomy design applications, through reference into other application formats such as spreadsheets or through internet browser-based systems with limited functionality. The current XBRL specification also has little to no support for presentation formatting information, so the display of such information may not be as the publisher intended. Further limitations pertain to the analysis of XBRL information which is usually performed after being brought into a spreadsheet application or is limited to simple pre-defined ratios displayed in browser-based applications. Browser-based and other applications have many limitations with respect to presenting information in end user customizable format. Moreover, it is specifically difficult for end users to analyze data in a browser-based application. Browsers used to display XBRL information generally lack the ability to analyze and directly compare large amounts of financial data from different documents at the same time. Currently, the analysis of XBRL data over multiple financial reports from the same or multiple companies is generally performed by manually exporting the data for each report to a separate application that enables such analysis (e.g. Excel). Use of browsers, with or without stylesheet transformation, to view XBRL reports also makes it difficult for end users to change the presentation to suit their needs or produce customized reports.

Additionally, different publishers of XBRL reports use different taxonomies. So the data from the reports are often not suitable for automated analysis and is not directly comparable. Additionally, data in such financial reports is generally "static" as of the date of the publication of the report. For example, if the report refers to the stock price, it is often the price as of the day of publication of the report (or a fixed date, e.g., the closing price on the last day of the quarter or fiscal year for which the report pertains).

As XBRL was envisioned primarily as a financial information transmission protocol, the XBRL specification contains little to no presentation information aside from the ordered listing of items and their parent-child relationship through presentation links. Also, as the taxonomy information and item meta-data is generally made available through internet reference, it is not available for off-line use unless saved to a local computer, which inhibits off-line use.

SUMMARY OF THE INVENTION

Various aspects of the invention overcome at least some of these and other drawbacks of known systems in addition to enabling extensive new functionality. The present invention overcomes drawbacks and adds additional capabilities by utilizing a dedicated application for the retrieval, display and analysis of XML financial information rather than through an internet browser-based system or incorporation into other application documents such as spreadsheets. The dedicated XML application may also access, either locally or remotely, collections of documents along with additional presentation and updated analysis information. This application system may also employ methods for the on-line distribution and updating of custom display and analysis information that can subsequently be used off-line.

One aspect of the invention relates to a computer-implemented interactive application for presenting and performing analysis on financial data in XBRL format (and other electronically tagged data formats). For simplicity, various aspects of the invention will be described in connection with a dedicated XBRL application. However, the invention is not so limited. The functionality can be implemented with financial data in other electronically tagged data formats and applications incorporating other additional related or unrelated functionality.

The dedicated XBRL application may include at least a file access component, a presentation component and an analysis component in an integrated XBRL display and analysis application. Other components may be provided. The XBRL application may be a computer-implemented desktop application that displays and analyzes financial information using an interactive user interface. The user interface may be a highly customizable multiple document interface (MDI) to enable multiple files to be opened at once and easily navigated between. Among other things, this enhances the ability to easily compare data from different reports. The file access component may include a file manager module and a company screener module (among other things) for enabling a user to select one or more local or remote files to be opened. A file manager allows user to select from a number of published reports presented in a conveniently organized window including categories such as industry group, author organization, report type, etc. The file manager may also allow access only to files which the user has permission to access and provide authentication of a file's publisher. A company screener allows a user to screen companies (or reports) based on various criteria which may be combined to create a search function against available companies (or reports).

The presentation component includes, among other things, a taxonomy module, a financial statement module, a template module and an output display module. The file access module may include one or more mechanisms for enabling a user to select one or more local or remote files (e.g., a company's quarterly or annual report or other files) to open which can be limited through permission-only access. The user interface may provide one or more options for how selected file(s) is (are) to be presented (e.g., different views, different templates, and other presentation options); mechanisms for displaying the user selected files, based on the user selected options; one or more options for the user to select types of analysis to be performed on the financial data; and mechanisms for displaying the results of the analysis, through the user interface of the application.

Significantly, the analysis component is an integral part of the application and communicates with the presentation component so that the analysis and the display of the results of the analysis can be performed in the application itself, without having to export, cut and paste or otherwise transfer the data to or from a separate analysis application. The analysis component provides the user with an advanced-level analysis that would otherwise require a professional level of expertise to perform manually.

The analysis component includes one or more software modules to perform various processing functions relating to analysis of the financial data contained in a selected file(s) (based on data in the file as reported, referenced formulas and, if desired, current data retrieved subsequent to the issuance of the report). The analysis component may include one or more of an analysis measures module, a comparison module and a charting module. The analysis module analyzes and calculates various (standard or custom) metrics based on the calculation of analysis formulas using data as reported and/or updated data (retrieved after the report is issued). Various standard metrics may be provided as per user selections to avoid the need for the user to create metrics from scratch. However, the analysis measures module may also enable the use of custom metrics specific to the document. If the application is connected to a network at the time the files are to be opened, one or more of the modules may retrieve new or updated analysis information that facilitates the processing functions described herein. Different formulas for common analysis measures may be retrieved for different taxonomies in order to facilitate comparison between two of more files. The comparison module performs processing and data structuring necessary to compare information from different files, which may conform to different taxonomies. Types of files that may be compared include annual reports, quarterly reports, research reports and/or other reports from the same or different companies. The charting module uniquely presents the information for selected items and unique analysis in a chart format. A user may select one or more line items from the financial statements, comparison view, analysis information and/or other displays in order to automatically render the information in a chart format.

A user interface may also include one or more options to enable: i) the data for a specific file for a specific company to be viewed in a variety of ways (detailed below); ii) the data from different files (e.g., different types of reports and/or the same type of reports but for different time periods) for a specific company to be viewed in a variety of ways (detailed below); and iii) the data for one or more files for two or more user selected companies to be viewed in a variety of ways (detailed below).

For example, based on one or more stored or retrieved templates and document formatting information, the file can be rendered using a standard or customized display format. In addition to individual document views and different levels of detail views, the application has a comparison view that displays content, calculated valuation and/or analytics for all or selected open files. The application allows users, at the click of a button, to switch between an "Report Date" view and an "Updated" views. In the Updated view information more current than the information contained in the file as published is used.

The user can also select to apply file-specific formatting to the information display or use one or more "Standard" presentation of default displays. A comparison display allows side-by-side comparative analysis across two of more companies. Using interactive display tools, users can, at the click of a button: i) change the currency of displayed financial information; ii) change the units of financial information; iii) change the display order of periods; iv) hide/show blank template rows; and/or v) change the presentation display detail level, among other things.

By selecting rows in various displays and clicking a toolbar button, or other means, a chart of selected items is displayed. When multiple XBRL files are opened simultaneously, a comparables view is enabled where the application can automatically compare information, valuations and/or analysis metrics across files from the same or different companies and display the results on a display or otherwise output the comparison.

For simplicity, various aspects of the invention will be described in connection with a company's annual report. However, the invention is not so limited. Various other types of reports and other financial information files can be used with the invention. For example, the files can be security analysts' research reports, financial forecasts and reports including various other types of financial and business information.

An example of a method according to one embodiment of the invention will now be described. Once the application has been installed on a computer (e.g., a desktop, a laptop a handheld computer or other computing device), one or more libraries of local or remote XBRL files can be accessed to open the one or more XBRL files. For example, a user may select one or more files to be opened, in any one of a variety of ways. For example, the user may use a File Manager or a company screener that are a part of a file access module of the application. The company screener may be used to find companies, for which files exist in one or more user accessible libraries, that meet certain criteria (e.g., within a certain industry, have analysis measures that fall within a certain range, etc.) Other techniques may be used to select files to be opened. Multiple files may be selected for opening at the same time. Upon user selection, the application can retrieve and open the selected file from local files and/or network files.

According to one embodiment, when XBRL files are opened, the application uses data from financial report filings in XBRL format to create updated or "live," interactive documents that can be customized for display. The displayed document may have valuations and other metrics automatically updated based on current or other updated information (e.g., up-to-date stock price) obtained via the internet or otherwise.

To accomplish these and other aspects of the invention, upon receipt of a user selection to open a file (or files), the application performs a series of steps. These steps may include one or more of retrieving (e.g., from an internet server, local storage and/other location) taxonomy information (e.g. financial statements, items and default display settings for the schema or taxonomy used by the file); retrieving formulas for analysis measures specific to the taxonomies referenced in a file; retrieving up-to-date data (e.g., stock prices and/or other updated financial data); building a financial statement based on the "As Reported" formatting information contained within the retrieved XBRL file and/or remotely retrieved; calculating various valuations and other analysis measures based on the information from the retrieved XBRL file and/or from updated data; retrieving one or more standard or customized report templates, loading at least one report template to apply to the data in the file; rendering customizable views of financial statements; calculating valuations and metrics and displaying (or otherwise outputting) an interactive; customized report. When multiple files are opened, the steps may further include generating one or more comparison views. The ability for the application to obtain updated data enables the it to create "live" documents from otherwise static, text files. Other steps may be performed and not all of the steps need be performed. The order of the steps may be varied as desired.

Any suitable XBRL publisher may be used to create files to be accessed by the application. As one example, an XBRL publication system may use taxonomy-specific spreadsheet templates and advanced processing code that can be used by filing companies to create XBRL files. Using a template-style interface, companies can create XBRL versions of financial reports with information to allow for its display in the application to appear with substantially the same formatting as in their current printed versions. Other XBRL, XML or other publishing techniques may be used.

Another aspect of the invention allows the user of the application to create groups (e.g., groups of companies using any criteria, such as by industry, geography, investment holdings or otherwise). For example, the user could create a group of companies representing its investment holdings to allow for the group access of all files pertaining to these companies and track and compare various financial data, valuations and metrics for members of the group and or compare individual performances to group performance.

These and other objects, features and advantages of the invention will be apparent through the detailed description of the invention and the drawings attached hereto. It is to be understood that both the foregoing general description and the following detailed description are exemplary and not restrictive of the scope of the invention.

BRIEF DESCRIPTION OF THE DRAWINGS

FIG. 4 is an illustrative view of a company screener interface of the XBRL application, according to one embodiment of the invention.

FIG. 5 is an illustrative view of a template display for the content of an XBRL report document and analysis measures, according to one embodiment of the invention.

FIG. 6 is an illustrative view of valuation analysis information, according to one embodiment of the invention.

DETAILED DESCRIPTION OF THE DRAWINGS

Figure 1:
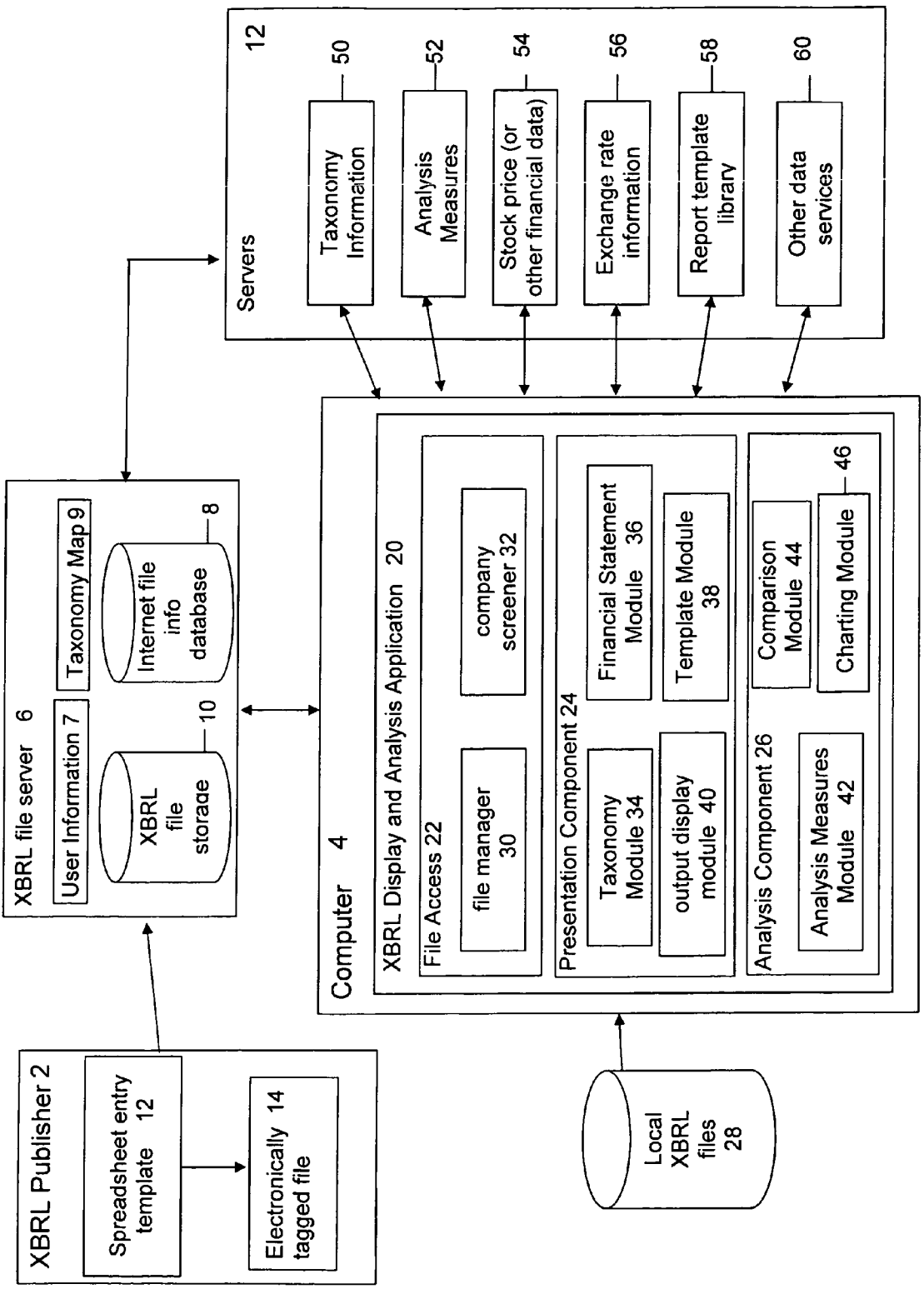
FIG. 1 is a high-level block diagram of a system according to one embodiment of the invention, including an XBRL display and analysis application with integrated presentation and analytic components, according to an embodiment of the invention.

In general, with reference to FIG. 1, one aspect of the invention may include a computer-implemented desktop application (e.g. XBRL Display and Analysis Application 20) that analyzes and presents financial information from XBRL (or XML or other electronically tagged data) file format. The application integrates a file access component 22, presentation component 24 and an analysis component 26 into a single application. The integration of these three components into a single application provides the ability to create and present updated, interactive, customizable displays (of XBRL reports and other documents). This is in contrast to browsers and other applications that import XML data into other file formats, which are typically more static, less interactive and less customizable display by the end user. The invention also provides significantly improved and more comparable analysis than is available if XML data is directly displayed in a browser or imported into a spreadsheet application for analysis.

FIG. 1 is a block diagram of a system for interactive customizable display and analysis of electronically tagged financial information, according to an embodiment of the invention. The system may include a file publisher 2, one or more computers 4, XBRL file server 6, Internet file information database 8, XBRL file storage 10, and/or one or more servers 12, among other things.

The items of FIG. 1 may be linked using well known computer network communications means including, but not limited to, wired and/or wireless LANs, WANs, the internet or public networks, and/or private networks, among others. Publisher 2 may be linked to a local XBRL file storage 10 and/or XBRL file server 6, among other things. The computer 4 may be linked to the local XBRL file storage 10, XBRL file server 6, internet file database 8 and/or servers 12, among other things. The XBRL file server 6 may also be directly linked to internet file database 8.

Publisher

Any suitable publisher 2 may be used by a company to publish financial reports as XBRL files. For example, the publisher 2 may comprise a spreadsheet entry template 12 for creating an electronically tagged file 14. A company or organization may also use existing software applications for creating, publishing and distributing XML/XBRL financial report files. The XML/XBRL file may be text or other electronically tagged information. Electronic tags may be used for various elements (e.g. a line item and/or other elements) to identify individual financial content items. Additional information, including customized information, about these elements may be contained within the file, through taxonomy references or through taxonomy information server 50. Additional information contained within the file may be used to further customize the display of data elements. The group of electronic tags (e.g. labels and other metadata) used to identify file content may be referred to as a taxonomy or schema, or, if multiple taxonomies are used, they may be referred to as taxonomies or taxonomy set. A taxonomy or taxonomy set referenced within the XML/XBRL file created by one company/publisher may be the same or different from a taxonomy referenced by another company/publisher.

A XBRL document may reference a publisher specific taxonomy and/or an industrial, accounting standard or other taxonomy used by multiple publishers to create the XML/XBRL document file(s). The application may directly reference the information contained within and referenced by such taxonomy schema(s) and may also reference additional information (enhanced information) about the taxonomies (50) not contained in such taxonomy references. In either case, the application may also access publisher specific display templates (58), also referred to as custom templates, which may be used in combination with taxonomy information for formatting information contained within a file to create the presentation component displays. As one example, an XBRL publication system (e.g., publisher 2) may include document specific formatting capability in spreadsheet entry template 12 that can be used by the Publisher 2 processing code to create an XBRL file 14 (or other electronically tagged file) which may contain the financial content and additional custom display information. The file thus may be electronically tagged using one or more taxonomies with (or without) additional customization information.

The electronically tagged file 14 may be, but is not limited to, financial reports (e.g. Annual Reports, quarterly reports or other SEC reports), research reports, earnings releases and/or other types of files. Using a template-style interface, companies can customize portions of their report document to appear as they desire in one or more of the application's presentation views.

The XBRL file may be published electronically to one or more locations. For example, the file may be electronically transmitted to one or more servers (e.g., XBRL file server 6) and stored on one or more storage systems (e.g. XBRL file storage system 10). Any network accessible file locations can be used (e.g., at the company's site, a third party site, at one or more sites local to the user and/or other sites.)

XBRL Storage

The XBRL file storage 10 may store one or more published electronically tagged files 14 from one or more publishers 2. The XBRL file storage 10 may interact with the file information database 8 of XBRL server 6, for search and retrieval purposes. XBRL files 14 may be stored to and retrieved from the XBRL file storage 10, which may be a database, or any other storage device. The XBRL Display and Analysis Application 20 may also publish tagged files (14) to XBRL file storage (10).

XBRL File Server

The XBRL file server 6 can be implemented as one or more central (or distributed) server(s) for providing one or more user computers (e.g., via computer 4) with access to one or more published files 14 and/or other information. Although not shown, multiple XBRL file servers may serve users' requests for published reports and/or other information. One or more XBRL file servers may be implemented based on various network characteristics including, but not limited to, number of user computers, number of publishers, location and/or other characteristics. The file server 6 may include access control mechanisms to limit who can access certain files 14 by applying user information 7.

Internet File Information Server

Internet file information database 8 may be associated with one or more XBRL file servers 6 and used to receive and store information from other servers 12 (e.g., remote servers) regarding published files 14. Information from servers 12 may also be collected at various times (e.g. periodically, in real-time, or based on a user triggered events such as user search). The information colleted from the server 12, for example, may relate to the analysis formulas pertaining to the taxonomies used by each published file stored in file storage 10. According to an embodiment of the invention, this analysis measure information (52) may be used to create common analysis measures maps 9 using information from documents adhering to different taxonomies to be stored into information fields on common database 8. As such, the content of published files may be associated with one or more information fields (e.g., industry group, author organization, report type, ticker, primary author, company name, market values, growth rates, margin ratios, etc) of file information database 8 as determined from mapping various taxonomies. Information fields may also be used as search criteria. Therefore, information fields for the published files stored at the file information database 8 may be used for later search and retrieval (e.g., via file manager 30 and company file screener 32) of files.

Taxonomy information is further described below with respect to the taxonomy information server 50. The XBRL server 6 may be characterized to support information from multiple custom (or standard) taxonomies which are referenced by published files that it maintains in file storage 10. Other updated information may be retrieved from various sources (e.g., remote servers 12) and stored in database 8 and provided to computers 4 as needed.

Servers

The servers 12 may include, but are not limited to, taxonomy information server 50, analysis measures server 52, stock price server 54, exchange rate server 56, report template server 58, and/or other data services 60. Although shown as separate servers, one or more of the servers may be combined. The servers 12 may be remote services offered by third party information providers or otherwise. One or more of the servers (50, 52, 54, 56, 58, 60) provide information related to taxonomies, analysis measures, stock prices, exchange rates, report templates and other services to the internet file information database 8 and/or user computers 4.

Taxonomy Information Server

The taxonomy information server 50 functions to provide taxonomy information including, but not limited to, applicable financial statement groups, items within each financial statement, and default formatting for the presentation of financial statements such as element order, indentation, font styling and other rendering information. A taxonomy information server 50 may supply information contained with taxonomies referenced by a document or additional custom or default taxonomy display information for such taxonomies. In one embodiment, the Internet file information database 8 may retrieve taxonomy information from taxonomy information servers 50 for common mapping purposes, as described above. In another embodiment, a user computer (e.g., computer 4) may directly access taxonomy information server 50 for taxonomy information display purposes. In both embodiments, electronically tagged data of a published file may be processed according to the corresponding publisher's taxonomy information which is retrieved from the taxonomy information server 50. Taxonomy information for a referenced taxonomy, which may be through referenced schema files, may comprise, among other things, labels, metadata, a custom set of financial statements, a set of line items for each statement and financial statement presentation information. Custom analysis formulas for each taxonomy are held in the Analysis measures server 52 (described below).

Taxonomy Information Component: Set of Financial Statements

A custom set of financial statements can be associated with a taxonomy or taxonomy set. A set of financial statement may include one or more of, income statement, balance sheet, cash flow statement, corporate performance statement, statement of shareholders' equity, supplemental financial information, income taxes, investments and derivatives, commitment and contingencies, post employment benefit plans, employee stock ownership plans, geographical segment information, business segment information, and management's discussion, among others.

Taxonomy Information Component: Line Items

Each of the financial statement may further include a set of line items with information (e.g. metadata) as to item type, value type, balance type and period type, in addition to labels. For example, item type may include monetary, string, shares and PerShare, among others. Value type may include period average, end of period, and beginning of period, among others. A balance type may be debit or credit and a period type may be duration or instant.

Taxonomy Information Component: Presentation Information

For the set of financial statements, financial statement presentation information may include line item ordering, label over-writes, underlines, shading, colors, font info (style, bold, italics, color, size), indentation, and display settings which set the conditions under which each line is displayed. A document can include over-rides for these default taxonomy settings to create an "As Reported" presentation.

Taxonomy Information Component: Analysis Measures

Information referenced by File Sever 6 and Computer 4 may further include a set of analysis measures and corresponding formulas associated with each taxonomy held in analysis measures server 52 in FIG. 1. In one embodiment the database 8 of file server 6 may retrieve analysis measures servers for mapping purposes, as described above. In another embodiment, the user computer may access the analysis measures server for the calculation of analysis measures by Analysis Component 26 for display by Presentation Component 24. The formulas may be used to calculate one or more analysis measures. Measures may include financial measures, valuation measures, and other commonly used measures for financial analysis. Table 1 below discloses some commonly used financial measure and the generalized formula used to calculate the corresponding measure. For each taxonomy, there may be element-specific formulas for these generalized formulas.

TABLE 1

| | |
|---|---|
| Cash Earnings: | EBITDA + Recognized Expense of Stock Option Plan + Interest Income(Expense), Net + Other Nonoperating Income Provision for Income Taxes |
| Comparable Earnings: | Net Income Applicable to Common Stockholders Cumulative Effect of Change in Accounting Principle Extraordinary Items Income from Discontinued Operations + After-Tax Expense of Nonrecurring Items |
| EBITDA: | Operating Income(Loss) + Restructuring and Impairment Provisions + Production-Related Impairment Charges + Depreciation and Amortization − Total |
| EBITDAP: | EBITDA + Pension Net Periodic Benefit Expense + Postretirement Plans Net Periodic Benefit Expense |
| Recurring Income: | Income Before Extraordinary Items and Change in Accounting Principals − Income from Discontinued Operations + After-Tax Expense of Nonrecurring Items |

Financial measures may be calculated from individual line items in corresponding financial statements and referenced updated information, such as stock prices. Various other measures may be constructed based on the type of analysis and method of valuation desired.

Analysis Measures Server

These and other various analysis measures may be provided by a measures server 52 which supplies analysis measures formulas associated with each taxonomy. These formulas may be used to calculate standard or custom financial measures (e.g., annual earnings, growth rate, profit margin, etc.) for standardized and comparative analysis. Administrators of server 52 or other users may create financial measures for various analysis purposes and publisher-specific taxonomies.

Stock Price Server and Exchange Rate Server

Additionally one or more servers, Stock price server 54 and Exchange rate server 56, may provide updated stock price and exchange rage information (e.g. to user computers and/or internet file information database 8 or elsewhere). This information may reflect recent changes and/or real time tracking of stock prices and exchange rate information. For example, this information may be supplied by third party information providers (e.g., Bloomberg) via the stock price server 54 and/or exchange rate server 56. Stock price and exchange rate information may be incorporated into analysis measure formulas to incorporate updated "live" information.

Remote Template Library/Other Services

The remote template library server 58 may include custom HTML (or other) templates created by one or more publishers of financial information. Multiple numbers of custom HTML report presentation templates may be stored at the template server 58 and used by computers 4 when presenting reports, such as in FIG. 5. The HTML templates allow published information to be presented in a customized manner according to company preferences. For example, the presentation information may include company logo, website, color schemes, fonts, graphics and/or other company specific information. Other services and customizable views may be provided to user computers and/or Internet file information database.

User Computers

One or more user computers 4 may be used in the system. For simplicity, FIG. 1 shows only one user computer 4. Some examples of a user computer 4 may include hand held devices, PCs, workstations, and/or kiosks, among others. The end users may include individual entities, business entities, financial analysts, corporate executives, and/or any other types of users who desire analysis and interactive display of financial reports and other financial information.

A user computer 4 may be a general purpose computer programmed with a XBRL Display and Analysis Application 20. The application 20 turns standard financial report filings in XBRL format into updated or "live," interactive documents with customized display accompanied by advanced taxonomy-specific financial analysis. The displayed document may have valuations and other metrics automatically updated based on current information (e.g., up-to-date stock price obtained via the internet or otherwise). The ability for the application to obtain updated data enables the application to create "live" documents from otherwise static text files and provide updated analysis. Updated information (e.g., stock prices, exchange rates) may be downloaded from the one or more servers 12 using the online connection to the various servers or otherwise.

XBRL Display and Analysis Application

The XBRL Display and Analysis Application 20 may be implemented in an on-line and/or off-line mode. In an online mode, the XBRL application 20 may access a XBRL file server 6, additional servers 12 and/or a local XBRL file storage device 28. In an offline mode, the XBRL application may access locally cached information from these servers and XBRL file storage device 28. To facilitate off-line use, the XBRL application 20 may retrieve updates at various times or whenever the user goes online. This enables the use of updated (if not current) templates, display information and other data.

The XBRL application 20 may include, but is not limited to, a file access component 22, presentation component 24 and/or analysis component 26. The file access component 22, presentation component 24 and the analysis component 26 communicate and work together to achieve various aspects of the invention. Collectively, they provide greater functionality than a standard browser-based interfaces or spreadsheet applications, which are commonly used to view XML and XBRL files.

The file access component 22 may comprise various modules, including, but not limited to, a file manager 30 and/or company file screener 32. The file manager 30 allows user(s) access to search personal directories (e.g., in on-line or offline mode) and potentially secure and/or permission based access to XBRL file storage 10 (e.g., in on-line mode) for XBRL and other files. These files can include SEC filings and other financial information published by companies and other organizations. A first time user can be registered with the XBRL file server to access some or all files via the file manager 30. Registration may include license keys, passwords and other standard software registration information, as is known commonly used in the art. The user can present a password and user identifier (or application identifier) after initial registration so that the user can begin to securely accessing files which they may be permitted to access using file manager 30. User information, including specific file access permissions may be stored in user information storage 7 on file server 6.

The file manager 30 of the XBRL Application 20 may present a number of files (e.g., annual report, quarterly reports, etc.) for a user to select from. Each file may be searched for using information fields such as industry group, author organization, publisher, report type, and/or other information. Based on the password and identification submitted at login matched against user information storage 7, the user is presented with files which the user has permissions to access. Predetermined permissions may be set for registered users/user computer (or application) to view files based on various levels of permission. One or more levels of permissions may include publisher level, author organization level, report type level, and individual file level. Permissions at one or more of these levels may be maintained for each registered user/user computer (or Application) in user information storage 7 on file server 6. The file manager 30 may be organized to display the authorized published files by file groups, industry group, author organization, report type, document details and/or other groupings.

The file access component 22 may also include a company screener 32. The company screener 32 may allow user to screen files (stored locally and/or at the XBRL file storage 10) filed by companies or organizations using a number of different criteria (e.g., information fields). For example, some criteria can include market value, growth rates, margins, utilization ratios, turnover ratios, leverage ratios, valuation multiples, relative values and/or other criteria. The values for each criteria may be determined from company specific filings (e.g., XBRL files) stored at XBRL file storage 10 and/or local XBRL file storage device 28. Thus, the user can screen through published files based on company specific file information fields stored in file information database 8 to facilitate in the selection of files of interest. Thus, files can be searched for and selected using either the file manager, company screener and/or other techniques.

The presentation component 24 may comprise various modules, including, but not limited to, taxonomy module 34, financial statement module 36, template module 38, and/or output display module 40. The modules may work together to display information either "As Reported" by a publisher 2 or using standardized default taxonomy presentations. Updated information from various sources (e.g., servers 12) may be combined with the information from files to create an updated "live" presentation display of valuation information.

The taxonomy module 34 may retrieve taxonomy information corresponding to the taxonomy of a selected XBRL file from a remote (e.g., server 50) or local source (e.g., locally cached). The corresponding taxonomy may be standard taxonomy or a customized taxonomy created by the publisher of the selected file. The application retrieves enhanced taxonomy information based on the taxonomy of the opened file. The enhanced information may be locally referenced and retrieved from within the XBRL file being opened. Additionally, the enhanced information may be remotely referenced and retrieved from taxonomy server 50 if the enhanced information is found in the taxonomy schema and linked files referenced by XBRL file opened by the application. Thus, the application adds enhanced presentation information specific to the taxonomy. The selected XBRL report may then be processed in order to apply the corresponding taxonomy information to the selected XBRL file. Alternatively, in an offline mode the XBRL application 20 may use a default taxonomy or stored taxonomy information.

Using the retrieved taxonomy information, a financial statement module 36 can create one or more financial statements. The retrieved taxonomy information may include information relating to the set of financial statements, set of line items for each financial statement and presentation information of the each financial statement/item. The financial statement module creates the one or more financial statements by using taxonomy information in combination with the electronically tagged information directly from the selected XBRL files. This allows electronically tagged information of the selected XBRL file to be translated into line items of one or more financial statements. Thus, the tagged information is formatted for display in financial statements, which automatically organize large amounts of financial information into convenient presentation display.

The presentation component 24 may include a template module 38 that retrieves an HTML template used to render the display of the information in the XBRL file(s) to a user. The HTML template may include company specific information views including logo, headers, footers, fonts, layout and other information. If a company specific template is not found, a default or standard template may also be used for such information views. Once a determination is made regarding which template should be used for a file, the template is applied to the outputted XBRL report presentation document. According to one embodiment of the invention, the user can interactively switch between "as reported" and standardized financial statement views of information in a given XBRL document.

An output display module 40 may be used for the presentation and visual display of the interactive XBRL report document information and analysis measures. Various aspects of the analysis component contribute to the information to be displayed in the output display. The XBRL report presentation may be output on a traditional computer display monitor via an interactive user interface, can be sent via email or other file transfer mechanism, can be printed or otherwise output. As detailed below, a user can make various selections, via a user interface, to specify what is to be output. The output display module uses the user input to control the presentation and display (or other output) in accordance with the user preferences.

An analysis component 26 may include, but is not limited to, analysis measures module 42, comparison module 44 and/or charting module 46. These modules work together to perform analysis for one or more selected XBRL files. Analysis component 26 operates in conjunction with the presentation component 22 and/or servers 12 to create the analysis needed for one or more XBRL files.

The analysis measure module 42 can retrieve a set of analysis measure formulas associated with the taxonomy for the selected XBRL file from remote server 52 or locally cached information. Valuation formulas and other financial measures may incorporate information from various sources including information from the XBRL file, stock price server 54 and exchange rate server 56 in order to supply analysis measures module 42 with information for creating up-to-date analysis using the updated figures and measures. The specified analysis may be performed using only the XBRL file information or the XBRL file information in combination with updated information.

Using the analysis measures module 42, detailed analysis including growth, margins, asset utilization, turnover, and leverage can be performed using formulas on the information in the file and/or updated data. In addition to several standard analysis measures performed (e.g., Financial Ratios, Post Employment Benefits, Employee Stock Ownership Plan, Altman Z-Score, DuPont Analysis, Grown Rate Analysis, Common Size Income Statement, Common Size Balance Sheet) other customized analysis measures may also be created and calculated as desired. For example, trends developing over multiple time periods (e.g., quarterly, yearly) can also be identified, displayed and charted. Furthermore, it should be appreciated that analysis measures may be calculated and displayed along with other information from the XBRL report document at varying analysis levels ranging from summary level to very detailed financial studies. Additionally, the user may select to create analysis without updated information in order to present analysis as it would have appeared using only information available as of the date of report publication(e.g., file publication). A user can toggle between as reported date and updated views.

When multiple XBRL report documents are opened, or information in a single XBRL report document contains information for multiple companies or multiple scenarios for the same company, the user can view company information and analysis measures for multiple companies or multiple reports for the same company in a comparables view. The comparison module 44 can create a comparison view which automatically compares information and/or analysis measures for one or more companies/files. The analysis module may create measures that can be used for direct comparison of information adhering to different taxonomies in a comparison view. For example, Company A and Company B may refer to their profit margins based on taxonomies using different terms (e.g., "margin" or "profit margin"), however, they both define the same thing. In comparison view the common analysis measure for these two terms may be recognized as both defining "profit margin" and displayed accordingly as a line item within the comparison view. The analysis measures (e.g. from server 52 or locally cached) may be used to facilitate this.

Comparative analysis may be performed using standardized information across the two or more companies or reports being compared (e.g., two or more opened files) or different reports or forecasting scenarios for the same company. Common analysis measures may be calculated from information contained in the one or more selected XBRL files which may adhere to different taxonomies. Taxonomy-specific formulas may be used to calculate common financial measures for each respective selected XBRL file. For example, when constructing measures of corporate performance for comparable analytical and valuation use, the choice of items to include in the common analytical measure formulas will depend on the company, industry, or accounting standard specific taxonomy employed by the file publisher. As a result, the common financial measures may be compared to one another in a comparative analysis across the two or more selected companies using their financial reports as submitted in the XBRL files even if they reference different taxonomy sets. Therefore, in addition to comparing two or more companies based on their reported information, the invention presents an additional level of comparability, as analysis is performed using analysis measures, not only items directly from the XBRL files.

The charting module 46 uniquely presents information selected from the financial statements, analysis views, comparables view, or other calculated analytical studies in a chart format. A user may select one or more line items from the financial statements, comparison view, analysis information and/or other displays in order to automatically render the information in a chart format. The charts may also display the results of analytical studies not otherwise displayed. A chart of selected items may be displayed in accordance with customizable formats. The customizable format may include type of graph (e.g., bar, area, scatter, pie, curve, etc.) scale values (e.g., x-axis units, y-axis units), color, and labels, among other things. The chart may be exported in a format that can be included by other applications, such as word processors.

According to an embodiment, services (e.g. stock price 54 and exchange rate 56) may create added value for financial analysis and comparison. The XBRL application 20 may retrieve updated security price information to create a real time (or delayed) XBRL report document. Prices may also be converted to any other currency using up-to-date (or historic) exchange rate information. These features allow for the comparisons of reports published at different times in using different currencies.

Figure 2:
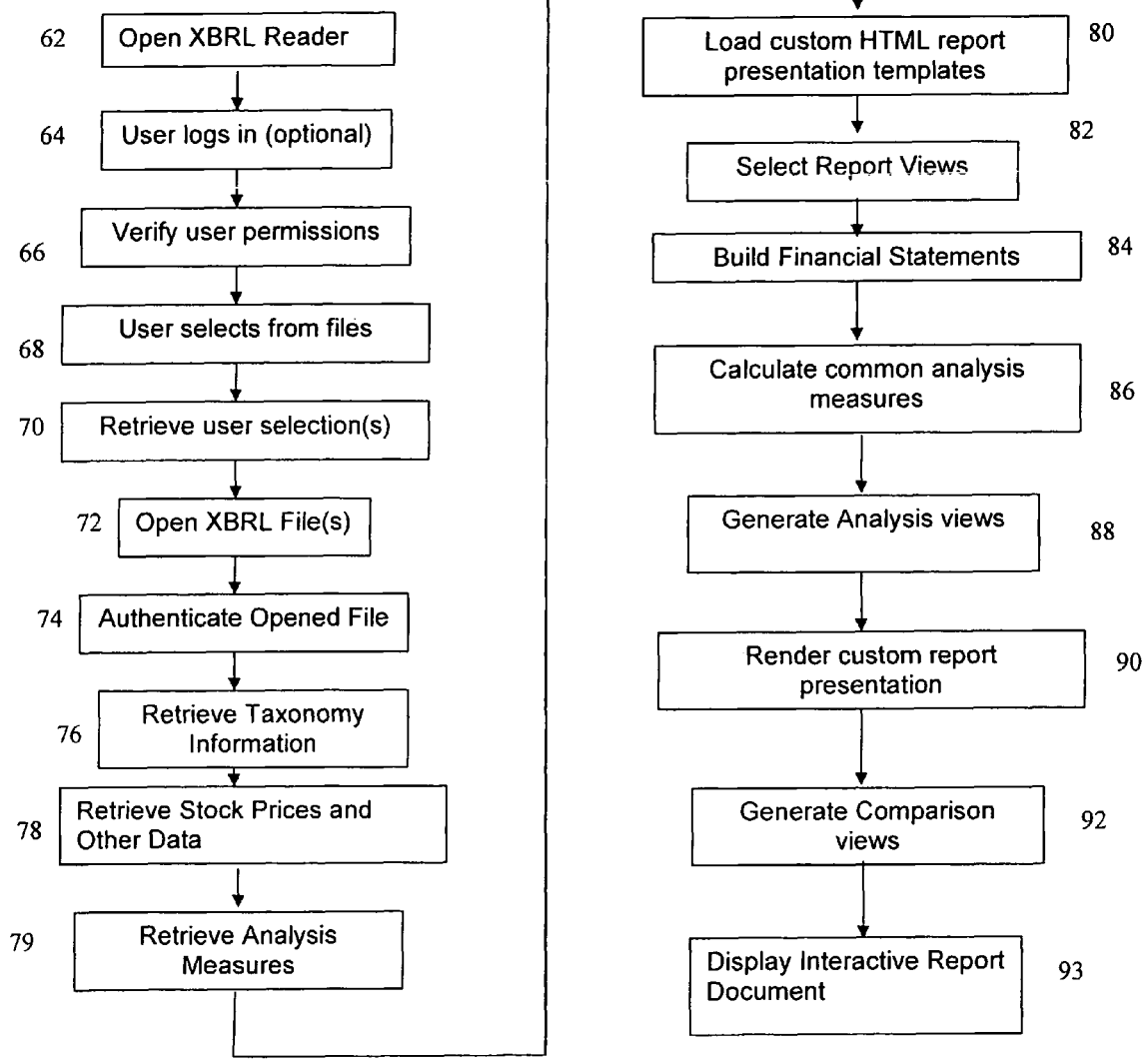
FIG. 2 is a high level flow chart for a method of accessing, analyzing and presenting the content of an XBRL or other electronically tagged document, according to one embodiment of the invention.

FIG. 2 is an example method for using Application 20 according to one embodiment of the invention to create interactive, customizable display and analysis of electronically tagged financial information. The description of this method assumes an XBRL Application 20 has been installed on a user computer and the user has registered with the XBRL file server 6 (although registration may not be necessary for non-permissioned file access). Once the application has been installed and started on a computer (e.g., a desktop, a laptop a handheld computer or other computing device) (operation 62) the user may login using user/user computer (or application) identifier and password (operation 64). If permissioned files are to be accessed, user credentials are verified and the permissions are determined (operation 66). The user may select from files presented to the user some of which may be based on user permissions (operation 68). The selected XBRL files are then retrieved. (operation 70). The selected XBRL files are opened by the application (operation 72). In operation 74, the application may authenticate the file by comparing a hash code of the file opened against those published (e.g., files in the XBRL file storage 10). Thereafter the application 20 may retrieve taxonomy information corresponding to the opened file (operation 76) from either remote or local location.

According to an embodiment, the taxonomy information may be retrieved in various ways. The information may be downloaded and locally cached to the user computer 4 the first time an instance references a new taxonomy. For subsequent instances that reference the taxonomy, the local cache can be used and updates on the taxonomy information (if any) may be retrieved.

After the taxonomy information has been retrieved stock prices, exchange rate information and/or other updated data associated with the taxonomies referenced by the opened files may be downloaded (operation 78). Analysis measures formulas may be retrieved from local or remote sources (operation 79). If an HTML report template and presentation file exists for the opened file, it may be loaded into the application (operation 80) from a local or remote location. From the taxonomy information, report presentation template and file content, the application will determine which views to display (operation 82) and build one or more financial statements (operation 84). The application may then calculate analysis measures for the taxonomy-specific formulas (operation 86), and generate views incorporating the analysis (operation 88). The application may then render the XBRL report document (operation 90) for display on the user computer or other output. In operations 92, comparative analysis on two of more open documents presented may be completed by calculating common analysis measures using standard or custom analysis measures formulas (e.g., retrieved in operation 79). The comparison views may be generated for display to the user (operation 92). As such, a complete interactive report document including report view, analysis view and comparison view, among others may be displayed (operation 93). The order of the steps is not limited to the order set forth above.

In an alternative method, the application may be implemented in an off-line mode. In this type of mode the application may access XBRL files and taxonomy information from user computer's local storage, including local XBRL file storage device 28. For example, the user computer may store files locally, and the application may cache previously remotely retrieved information locally, in order to utilize the application in an offline mode.

Figure 3:
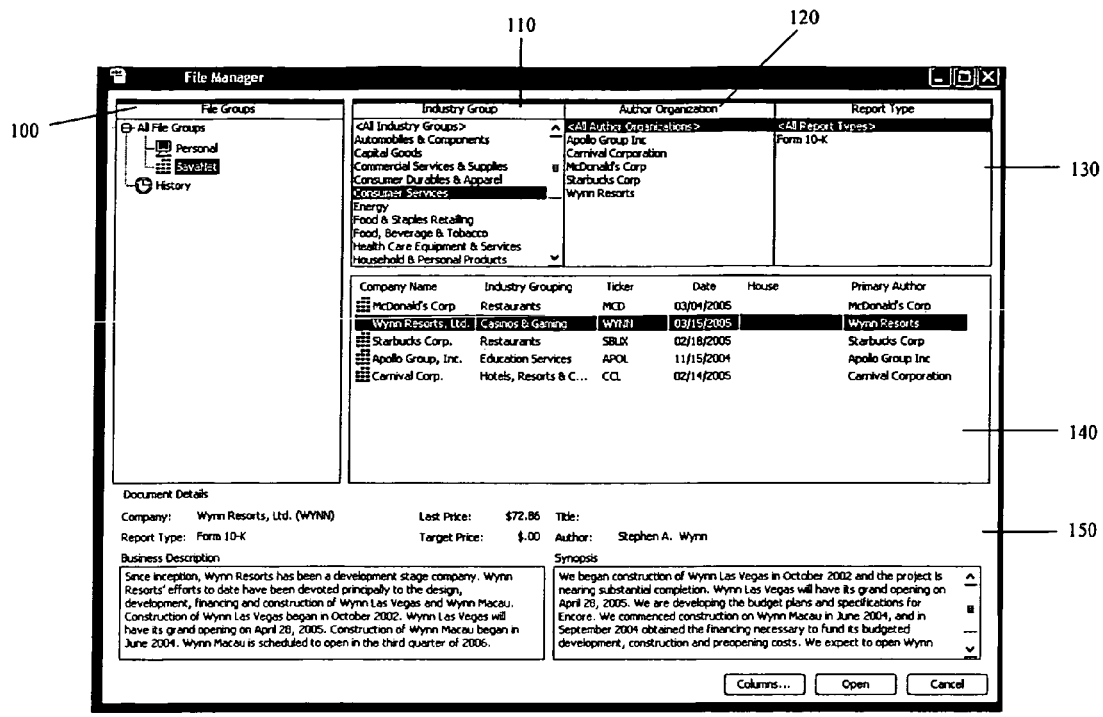
FIG. 3 is an illustrative view of XBRL file manager interface, according to one embodiment of the invention.

FIG. 3 is an example screen shot of a file manager screen. The file manager screen may enable the user to interface with the file manager 30. The file manager screen may display selection windows by file group 100, industry group 110, author organization 120, report type 130, and/or individual files 140. A document details 150 panel may present details based on a selected file from the individual file's window. As used here, a selected file may be one that is highlighted (or otherwise selected) but not necessarily opened. The file manager 30 may present the files according to a file group 100 including personal files, internet files (e.g., labeled "SavaNet" with publisher sub-groups) and history or recently accessed files. Personal files may be stored locally at user computer 4, which may be useful, for example, for accessing user-created files or use in an off-line mode. History files may be those previously viewed and cached for a predetermined period of time on the user computer. Internet files may be accessed from the XBRL file server 6. Files accessible based on permission criteria using user/password, license key or other user or application identifier may be displayed as sub-groups under the Internet files group. One or more subgroups based on user permissions (not shown) may include publisher, author organization, report type, and/or individual files.

Figure 4:
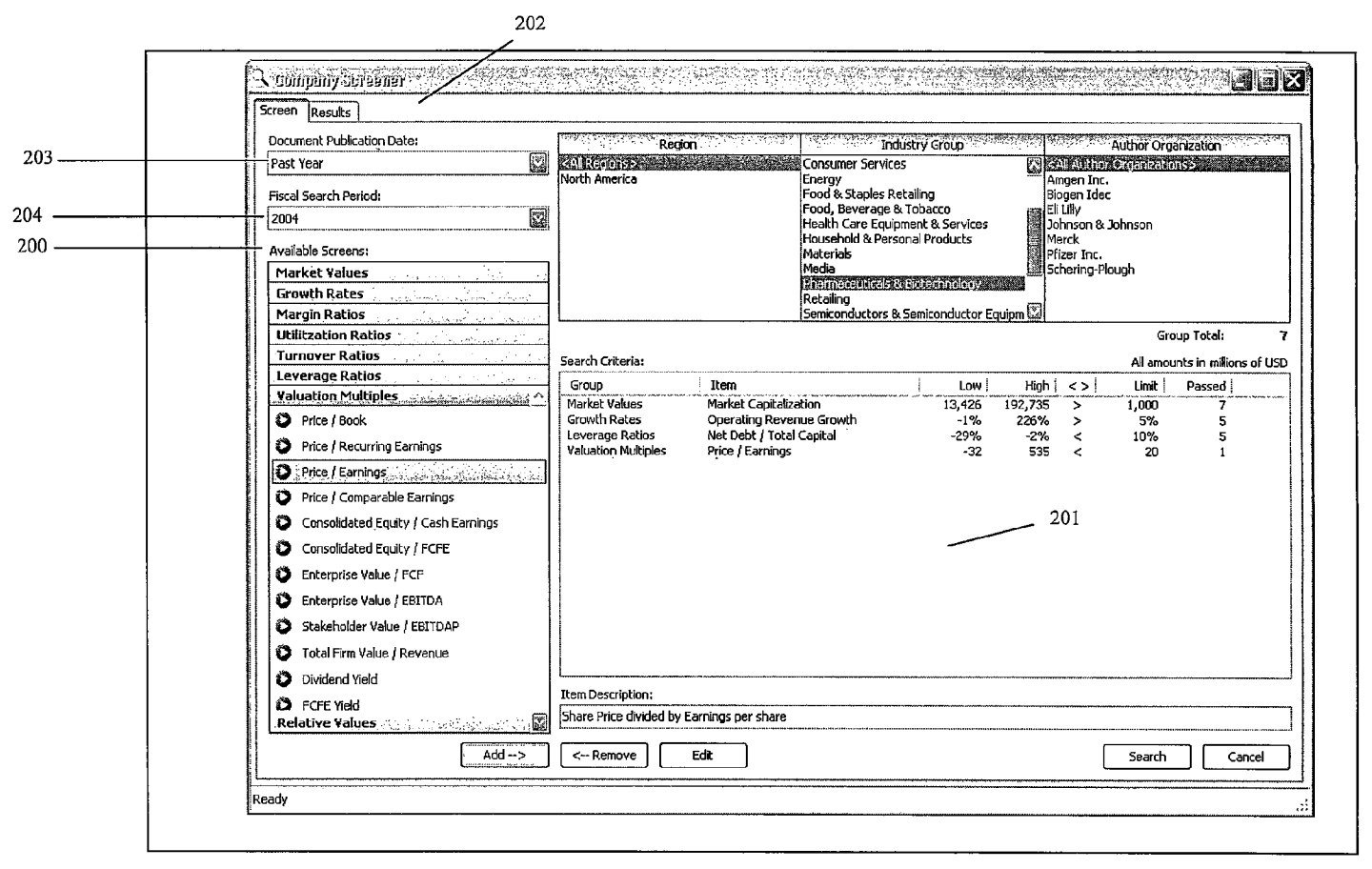

FIG. 4 is an example screen shot of a Company Screener portion of the user interface. The Company Screener may enable a user to search for companies (or reports) by various criteria. A user can limit searches to document publication dates using item 203 or fiscal period using item 204. By way of example, selections may be made by one or more of region, industry groups, author organization (e.g., publisher) and/or report type (as shown, for example, in FIG. 3). The companies (or reports) may be screened using available screens 200 including market value, growth rates, margin ratios, utilization ratios, turnover ratios, leverage ratios, valuation multiples, and relative values, among other screens. Each screen may be associated with one or more search criteria as displayed in search criteria window 201. The one or more search criteria from the one or more available screens 200 may be added and/or removed to create a customized search of companies (or reports). Various screen criteria sets can be stored for re-use. One or more companies (or reports) may be displayed and selected from the results screen via results tab 202. Various other criteria and categories of criteria may be used to screen companies (reports).

Figure 5:
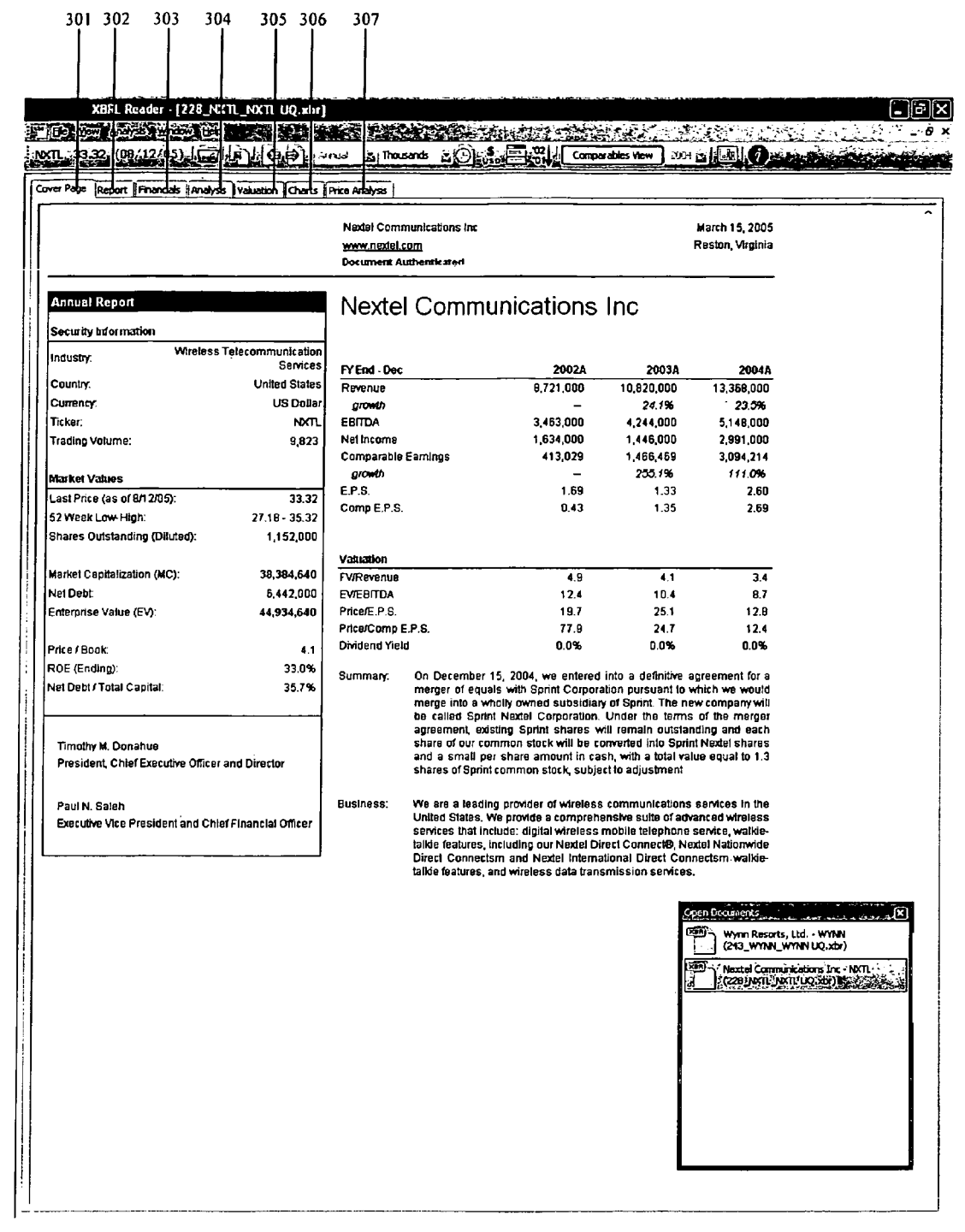

FIG. 5 is an illustrative example of a screen shot of a custom presentation of an XBRL report document for an open file, according to one embodiment of the invention. FIG. 5 illustrates an example of various tabs (e.g., corresponding to different document "views" or other options) that a user may select. The tab views may include a cover page tab view 301, a report tab view 302, a financials tab view 303, an analysis tab view 304, a valuation tab view 305, a charts tab view 306 and/or a price analysis tab view 307. More or less tabs may be used and additional user interfaces for grouping views may be employed.

Selection of the Cover Page tab view 301 may cause the application to display document and summary information using a template of the type shown in FIG. 5. Selecting the Report tab view 302 may cause the application to display the actual report issued by the organization (e.g., annual report) in its original file format, if the application has access to applications necessary to display such information. Selecting the Financials tab view 303 may cause the application to cause the application to present various levels of financial information, from a summary to a detailed line item financial statement (e.g., income statement, balance sheet, income taxes, cash flow statement, etc.). Selecting the Analysis tab view 304 may cause the application to present an analysis of the financial information accounting for one or more metrics. Various options for types of analysis may include, but are not limited to, Financial Ratios, Post Employment Benefits, Employee Stock Ownership Plan, Altman Z-Score, DuPont Analysis, Grown Rate Analysis, Common Size Income Statement, Common Size Balance Sheet and/or other metrics.

Selecting a Valuation tab view 305 may cause the application to present various valuation metrics. FIG. 6 is an illustrative example of a screen shot of various valuation metrics. The valuation information may be created using updated information retrieved when the file is opened including stock price and using updated information. This allows valuation analysis to be conducted based on current or most recent information available to the application. Thus, the user may be presented with analysis that goes beyond the reported information.

Figure 7:
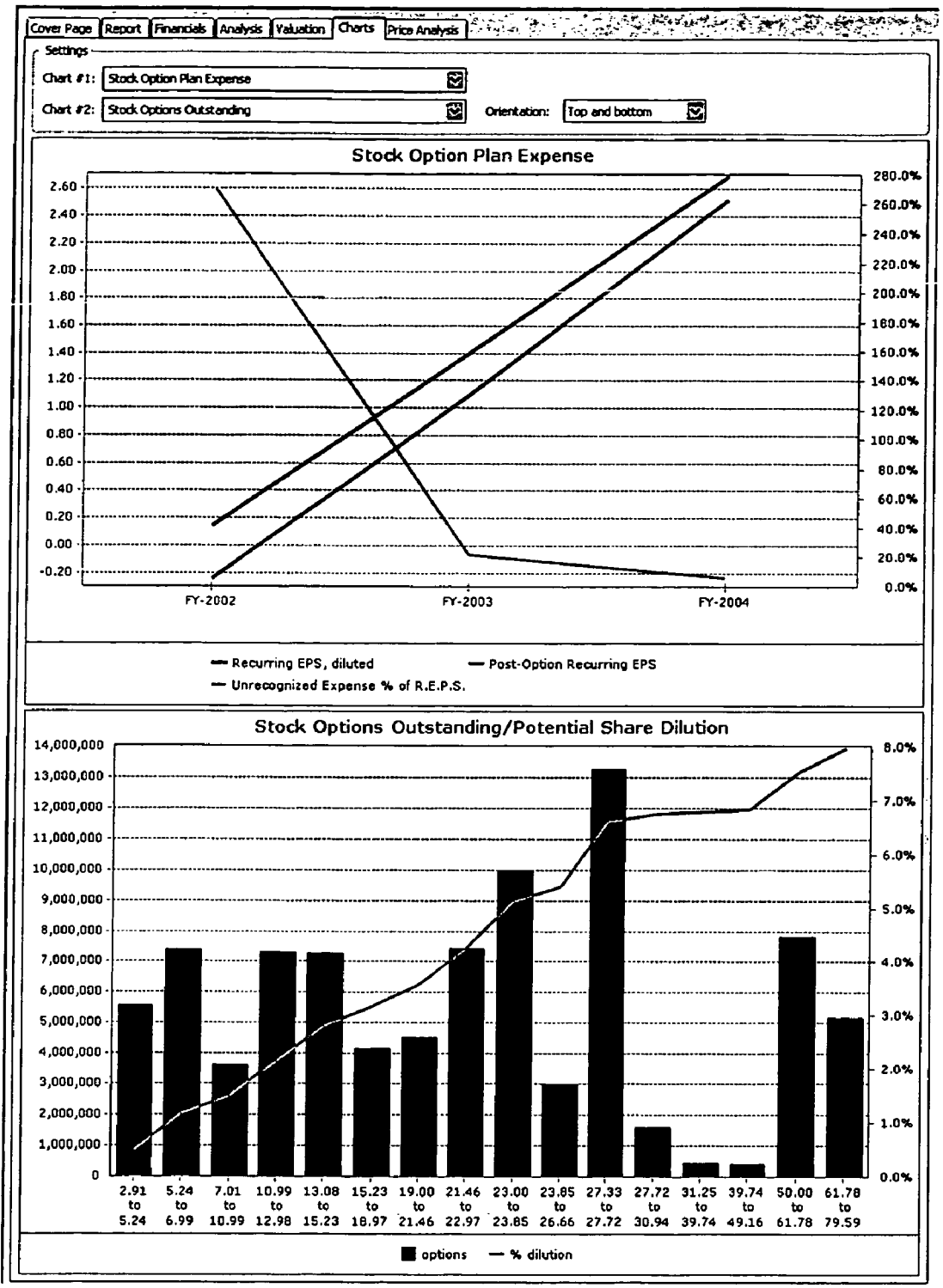
FIG. 7 is an illustrative view of two charts, according to one embodiment of the invention.

Selecting a Chart tab view 306 may cause the application to present various charting options for information according to user selection. In response to user selection (and/or default or automatic selections), the application may generate and present one or more charts for presentation. FIG. 7 is one example of a screen shot of a display when the Chart tab is selected. Settings may be chosen to display 2 (or more) charts simultaneously.

Selecting the Price Analysis tab view 307 may cause the application to create a chart displaying stock price according to various user selected criteria (e.g., by quarter or other time interval) to show a history of the company's stock price.

Figure 8:
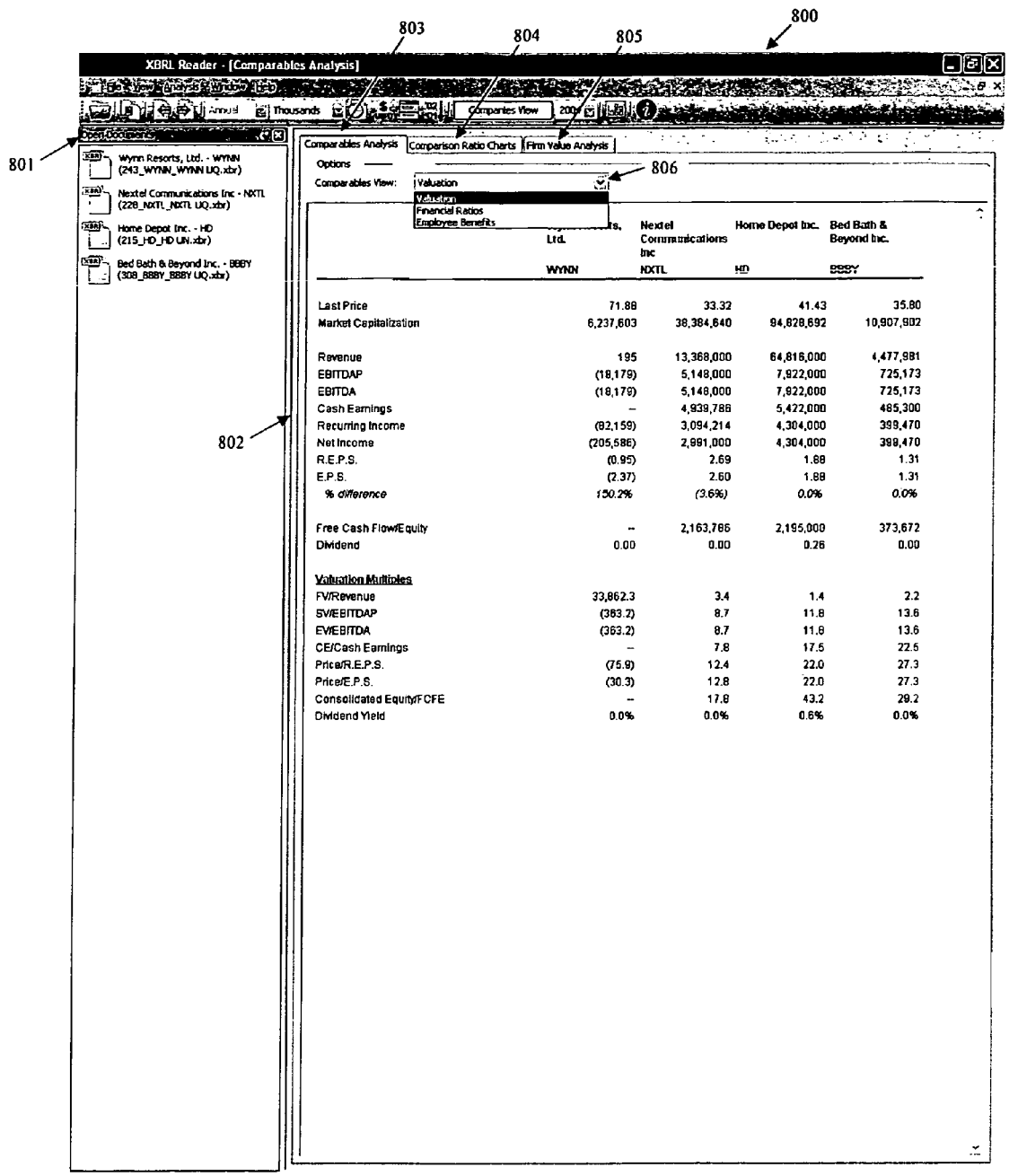
FIG. 8 is an illustrative view of a Comparables Analysis view of the XBRL application, for two open files, according to one embodiment of the invention.

As shown, by way of example in FIG. 8, a Comparison View interface 800 may include Open Documents display portion 801 that displays the currently open documents. Two or more of the open documents may be selected (in any suitable manner) to enable a user to specify which documents should be compared. A Main Display portion 802 of the interface may present various views, depending on user selection. For example, the application may include one or more of a Comparable Analysis View 803, a Comparison Ratio Charts View 804, a Firm Value Analysis View 805 and/or other views. The application may also provide one or more options 806 for the user to select criteria for comparison in the one or more views.

For example, as shown in FIG. 8, selection of the Comparables Analysis tab may enable the display of options such as, valuation, financial ratios, and employee benefits, among others. As shown, the Comparables Analysis View (with the Valuation Criteria selected) displays in the Main Display portion 802, the information shown in FIG. 8. The Comparison Ratio Charts View may display a comparison of various ratios of selected measures for the companies.

Additionally, the views of FIGS. 3 through 7 may be further customizable for a desired view. For example, different levels of detail may be selected (e.g., one or more line items may be selected) and viewed in the form of a chart. This allows user to view any desired combination of information in chart format by selecting one or more items from the analysis presented in the Companies view or Comparables view. The chart may be created in a separate window which allows the user to further edit and/or modify the display for other uses.

As such, the invention provides advantages that allow users to view financial information from various sources in a standardized manner within an interface which allows highly customizable, interactive view of the financial information and along with financial analysis measures.

According to another aspect of the invention, the application separates "sections" of the document into information presented by the publisher and updated or calculated analysis performed by the application post-publication. The user can also toggle between an "Report Date" View and an "Updated" view. When in the "Report Date" mode, the application ignores updated data. When in "Updated" mode the application presents the same type of information and/or analysis as in the "As Reported" view, but uses updated data and/or other information, as described above. The application allows users, at the click of a button, to switch between "Report Date" and "Updated" views.

In the foregoing specification, the invention has been described with reference to specific embodiments thereof. Various modifications and changes may be made thereto without departing from the broader spirit and scope of the invention. The specification and drawings are, accordingly, to be regarded in an illustrative rather than a restrictive sense.

The invention claimed is:

1. A computer program product, comprising a computer-readable storage medium including computer-readable instructions embodied therein, that when executed by one or more processors, implement a method for the retrieval, analysis and display of electronically tagged financial data, the instructions comprising:

an integrated file access component, analysis component and presentation component for accessing, analyzing and presenting electronically tagged financial data within the application;

the file access component comprising:

one or more user selection modules for selecting a plurality of files, the files including at least electronically tagged financial data which adhere to different taxonomies that are associated with the same type of content, the analysis component comprising:

one or more analysis modules for calculating at least a first common analysis measure for comparison and analysis of electronically tagged financial data from a first file which adheres to a first taxonomy and corresponding electronically tagged financial data from a second file which adheres to a second taxonomy that are associated with the same type of content, including (i) a first formula having components based on the first taxonomy for calculating the first common analysis measure from electronically tagged financial data from the first file, and (ii) a second formula having components based on the second taxonomy for calculating the first common analysis measure from electronically tagged financial data from the second file, wherein the first common analysis measure comprises an analytical metric not present in either the first file or the second file; and the presentation component comprising:

one or more presentation modules for presenting information associated with the selected files, the presented information including data elements and a calculation of at least the first common analysis measure automatically formatted according to presentation information associated with the selected files so as to provide simultaneous line-by-line display of at least the first calculated common analysis measures that correspond to different taxonomies and another calculated common analysis measure.

2. The computer program product of claim 1, wherein the file access component includes a means for retrieving the files with data elements corresponding to a taxonomy associated with an industry, country, or user-created list.

3. The computer program product of claim 1, wherein the file access component provides a means for user-specific access to files which the user has permission to access.

4. The computer program product of claim 1, wherein the file access component provides a means for authentication of a file publisher associated with at least one of the selected file to be displayed by the presentation component.

5. The computer program product of claim 1, wherein the presentation information includes taxonomy information and display template information which are used to format the calculated common analysis measures that correspond to different taxonomies that are associated with the same type of content into the line-by-line display for comparison.

6. The computer program product of claim 2, wherein the one or more of the formulas are based on the industry, country, or user-created group associated with the selected files.

7. The computer program product of claim 6, wherein the analysis module further comprises means for calculating, for presentation within the analysis view, one or more common analysis measures using the one or more formulas.

8. The computer program product of claim 1, wherein the one or more user selection modules includes a file management interface having means for searching for files from a local storage and remote storage.

9. The computer program product of claim 1, further comprising a multiple document interface for displaying and navigating the presented information.

10. The computer program product of claim 1, wherein the one or more presentation modules includes a template module comprising means for selecting one or more custom display templates to apply to at least one of one of the selected files based on a publisher of the selected file.

11. The computer program product of claim 1, wherein the one or more presentation modules includes a taxonomy module comprising means for retrieving enhanced taxonomy presentation information not found in taxonomy schema and linked files referenced by the at least one selected files accessed by the computer program product which are used to format the calculated common analysis measures that correspond to different taxonomies that are associated with the same type of content into the line-by-line display for comparison.

12. The computer program product of claim 11, wherein the enhanced taxonomy presentation information may be either remotely or locally referenced and retrieved from within the at least one selected file being accessed by the computer program product.

13. The computer program product of claim 10, wherein the template module comprises means for customizing the electronically tagged financial data based on the one or more custom display templates.

14. The computer program product of claim 1, wherein the one or more presentation modules includes a financial statement module comprising means for creating as part of the presented information, financial statements from the presented information.

15. The computer program product of claim 1, further comprising an output display module for display of presentation information and interactive display controls for altering display settings.

16. The computer program product of claim 15, wherein the display settings include a group of display settings including: unit scaling, currency, period selection, period order and blank row display.

17. The computer program product of claim 1, wherein the analysis module further comprises means for retrieving updated analysis information after a publication date of the at least one the selected files, generating analysis based on the updated analysis information and replacing presented information with the updated analysis information.

18. The computer program product of claim 17, wherein the updated analysis information includes one or more of analysis formulas, stock price or exchange rate information.

19. The computer program product of claim 1, wherein the formulas and presentation information are separate from the selected files and retrieved from a remote location and stored at a local computer where the computer program product is running.

20. The computer program product of claim 19, including means for executing the computer program product in an off-line mode by accessing retrieved information stored on the local computer.

21. The computer program product of claim 1, further comprising a charting module comprising means for charting information associated with at least one of the selected files.

22. The computer program product of claim 1, wherein the file access module includes a company screener comprising means for screening files based on user-selectable criteria.

23. The computer program product of claim 22, wherein the user-selectable criteria includes data elements and common analysis measures.

24. The computer program product of claim 1, further comprising a comparison module comprising means for calculating common analysis measures associated with two or more selected files and means for generating one or more comparison views of common data elements from the two or more selected files.

25. The computer program product of claim 24, wherein one or more comparison views, report views, and analysis views are displayed together within an interactive report document.

26. The computer program product of claim 1, further comprising a means for publishing local files to a remote or Internet file location.

27. The computer program product of claim 1, wherein the computer program product is browser-based.

28. A computer program product, comprising a computer-readable storage medium including computer-readable instructions embodied therein, that when executed by one or more processors, implement a method for the retrieval, analysis and display of electronically tagged financial data in XBRL format, the instructions comprising:

an integrated file access component, analysis component and presentation component for accessing, analyzing and presenting electronically tagged financial data in XBRL format within the application;

the file access component comprising:

one or more user selection modules for selecting a plurality of XBRL files, the XBRL files including at least electronically tagged financial data which adhere to different taxonomies that are associated with the same type of content, the analysis component comprising:

one or more analysis modules for calculating at least a first common analysis measure for comparison and analysis of electronically tagged financial data from a first file which adheres to a first taxonomy and corresponding electronically tagged financial data from a second file which adheres to a second taxonomy that are associated with the same type of content, including (i) a first formula having components based on the first taxonomy for calculating the first common analysis measure from electronically tagged financial data from the first file, and (ii) a second formula having components based on the second taxonomy for-calculating the first common analysis measure from electronically tagged financial data from the second file, wherein the first common analysis measure comprises an analytical metric not present in either the first file or the second file; and the presentation component comprising:

one or more presentation modules for presenting information associated with the selected XBRL files, the presented information including data elements and a calculation of at least the first common analysis measure automatically formatted according to presentation information associated with the selected XBRL files so as to provide simultaneous line-by-line display of at least the first calculated common analysis measures that correspond to different taxonomies and another calculated common analysis measure.

29. The computer program product of claim 28, wherein the file access component includes a means for retrieving the XBRL files with data elements corresponding to a taxonomy associated with an industry, country, or user-created group.

30. The computer program product of claim 28, wherein the file access component includes a means for enabling user-specific access to XBRL files which a user has permission to access.

31. The computer program product of claim 28, wherein the file access component includes a means for authentication of a file publisher associated with the at least one of the selected XBRL files to be displayed by the presentation component.

32. The computer program product of claim 28, wherein the presentation information includes taxonomy information and display template information which are used to format the calculated common analysis measures that correspond to different taxonomies that are associated with the same type of content into the line-by-line display for comparison.

33. The computer program product of claim 29, wherein one or more of the formulas are selected based on the taxonomy associated with the industry, country, or user-created group associated with the selected XBRL files.

34. The computer program product of claim 33, wherein the analysis module further comprises means for calculating, for presentation within an analysis view, one or more common analysis measures using one or more formulas.

35. The computer program product of claim 28, wherein the one or more user selection modules includes a file management interface having-means for searching for XBRL files from a local storage and remote storage.

36. The computer program product of claim 28, further comprising a multiple document interface for displaying and navigating the presented information.

37. The computer program product of claim 28, wherein the one or more presentation modules includes a template module comprising means for selecting one or more custom display templates to apply to at least one of the selected XBRL files based on a publisher of the XBRL file.

38. The computer program product of claim 28, wherein the one or more presentation modules includes a taxonomy module comprising means for retrieving enhanced taxonomy presentation information not found in taxonomy schema and linked files referenced by the XBRL files accessed by the computer program product which are used to format the calculated common analysis measures that correspond to different taxonomies that are associated with the same type of content into the line-by-line display for comparison.

39. The computer program product of claim 38, wherein the enhanced taxonomy presentation information may be either remotely or locally referenced and retrieved from within the at least one of the selected XBRL files being accessed by the computer program product.

40. The computer program product of claim 37, wherein the template module comprises means for customizing the electronically tagged financial data based on the one or more custom display templates.

41. The computer program product of claim 28, wherein the one or more presentation modules includes a financial statement module comprising means for creating as part of the presented information, financial statement views from the presented information.

42. The computer program product of claim 28, further comprising an output display module for display of presented information and interactive display controls for altering display settings.

43. The computer program product of claim 42, wherein the display settings include a group of display settings including: unit scaling, currency, period selection, period order and blank row display.

44. The computer program product of claim 28, wherein the analysis module further comprises means for retrieving updated analysis information after publication date of at least one of the XBRL files, generating analysis based on the updated analysis information and replacing presented information with the updated analysis information.

45. The computer program product of claim 44, wherein the updated analysis information includes one or more of analysis formulas, stock price or exchange rate information.

46. The computer program product of claim 28, wherein the formulas and presentation information are separate from the selected XBRL files and retrieved from a remote location and stored at a local computer where the computer program product is running.

47. The computer program product of claim 46, including means for executing the computer program product in an off-line mode by accessing retrieved information stored on the local computer.

48. The computer program product of claim 28, further comprising a charting module comprising means for charting information associated with at least one of the selected XBRL files.

49. The computer program product of claim 28, wherein the file access module includes a company screener comprising means a module for screening XBRL files based on user-selectable criteria.

50. The computer program product of claim 49, wherein the user-selectable criteria includes data elements and common analysis measures.

51. The computer program product of claim 28, further comprising a comparison module comprising means for calculating common analysis measures associated with two or more selected XBRL files and means for generating one or more comparison views of common data elements from the two or more selected XBRL files.

52. The computer program product of claim 51, wherein one or more comparison views, report views, and analysis views are displayed together within an interactive report document.

53. The computer program product of claim 28, further comprising a means for publishing local files to a remote or Internet file location.

54. The computer program product of claim 28, wherein the computer program product is browser-based.

55. A computer-implemented method for processing electronically tagged financial data in XBRL format, the method being executed by one or more processors configured to perform a plurality of operations comprising:
 selecting a plurality of XBRL files, the XBRL files including at least electronically tagged financial data which adhere to different taxonomies that are associated with the same type of content;
 calculating at least a first common analysis measure for comparison and analysis of electronically tagged financial data from a first file which adheres to a first taxonomy and corresponding electronically tagged financial data from a second file which adheres to a second taxonomy that are associated with the same type of content, including (i) a first formula having components based on the first taxonomy for calculating the first common analysis measure from electronically tagged financial data from the first file, and (ii) a second formula having components based on the second taxonomy for calculating the first common analysis measure from electronically tagged financial data from the second file, wherein the first common analysis measure comprises an analytical metric not present in either the first file or the second file; and
 presenting information associated with the selected XBRL file, the presented information including data elements and a calculation of at least the first common analysis measure automatically formatted according to presentation information associated with the selected XBRL files so as to provide simultaneous line-by-line display of at least the first calculated common analysis measures that correspond to different taxonomies and another calculated common analysis measure.

56. The computer-implemented method of claim 55, wherein the selecting further comprising retrieving the XBRL files with data elements corresponding to a taxonomy associated with an industry, country, or user-created list.

57. The computer-implemented method of claim 55, wherein the selecting further comprises user-specific access to XBRL files which a user has permission to access.

58. The computer-implemented method of claim 55, wherein the selecting further comprises authentication of a file publisher associated with the selected XBRL files to be displayed.

59. The computer-implemented method of claim 55, wherein the presentation information includes taxonomy information and display template information which are used to format the calculated common analysis measures that correspond to different taxonomies that are associated with the same type of content into the line-by-line display for comparison.

60. The computer-implemented method of claim 56, wherein the one or more formulas are based on the industry, country, or user-created group associated with the selected XBRL files.

61. The computer-implemented method of claim 60, further comprising calculating, for presentation within the analysis view, one or more analysis measures using one or more formulas.

62. The computer-implemented method of claim 55, further comprising searching for XBRL files from a local storage and remote storage.

63. The computer-implemented method of claim 55, further comprising displaying and navigating the presented information.

64. The computer-implemented method of claim 55, wherein the presentation information further includes one or more custom display templates to apply to at least one of the selected XBRL files based on a publisher of the selected XBRL file.

65. The computer-implemented method of claim 55, wherein the presentation information further includes enhanced taxonomy presentation information not found in taxonomy schema and linked files referenced by the XBRL files which are used to format the calculated common analysis measures that correspond to different taxonomies that are associated with the same type of content into the line-by-line display for comparison.

66. The computer-implemented method of claim 65, wherein the enhanced taxonomy presentation information may be either remotely or locally referenced and retrieved from within at least one of the XBRL files being accessed by the computer program product.

67. The computer-implemented method of claim 64, further comprising customizing the electronically tagged financial data based on the one or more custom display templates.

68. The computer-implemented method of claim 55, further comprises creating as part of the presented information, financial statements from the presented information.

69. The computer-implemented method of claim 55, further comprising displaying interactive display controls for altering display settings of presented information.

70. The computer implemented method of claim 69, wherein the display settings include a group of display settings including: unit scaling, currency, period selection, period order and blank row display.

71. The computer-implemented method of claim 55, further comprising retrieving updated analysis information after a publication date of at least one of the selected XBRL file, generating analysis based on the updated analysis information and replacing presented information with the updated analysis information.

72. The computer implemented method of claim 71, wherein the updated analysis information includes one or more of analysis formulas, stock price or exchange rate information.

73. The computer-implemented method of claim 55, wherein the formulas and presented information are separate from the selected XBRL files and retrieved from a remote location and stored at a local computer where the application is running.

74. The computer-implemented method of claim 73, wherein the application executes in an off-line mode by accessing retrieved information stored on the local computer.

75. The computer-implemented method of claim 55, further comprising charting information associated with at least one of the XBRL files.

76. The computer-implemented method of claim 55, further comprising screening XBRL files based on user-selectable criteria.

77. The computer-implemented method of claim 76, wherein the user-selectable criteria includes data elements and common analysis measures.

78. The computer-implemented method of claim 55, further comprising calculating common analysis measures associated with two or more selected XBRL files and generating one or more comparison views of common data elements from the two or more selected XBRL files.

79. The computer-implemented method of claim 78, wherein one or more comparison views, report views, and analysis views are displayed together within an interactive report document.

80. The computer-implemented method of claim 55, further comprises comprising publishing local files to a remote or Internet file location.

* * * * *